Dec. 17, 1940.   H. ARENS ET AL   2,225,439
APPARATUS FOR INTENSIFICATION OF WEAK RADIATIONS
Filed March 13, 1940

Hans Arens
Karl van Briessen
INVENTORS

BY
THEIR ATTORNEYS

Patented Dec. 17, 1940

2,225,439

UNITED STATES PATENT OFFICE 2,225,439

APPARATUS FOR INTENSIFICATION OF WEAK RADIATIONS

Hans Arens, Dessau, and Karl van Briessen, Leipzig, Germany, assignors to General Aniline & Film Corporation, New York, N. Y., a corporation of Delaware Application March 13, 1940, Serial No. 323,720
In Germany February 28, 1939

5 Claims. (Cl. 250—71)

This invention relates to an apparatus for intensification of weak radiations especially of light- or ultraviolet emissions.

According to the principle of the light rod it is known to conduct a pencil of rays of certain aperture, inside of a glass rod a smaller or bigger distance and have it emerge then at the end thereof. In this process there is made use of the total reflection of the rod, in order to conduct light-rays entering at the upper end of the rod unchanged through it.

Moreover, it is known that the total reflection may be used to intensify to visibility weak radiations at one end of the rod, for example light-rays or ultraviolet emissions, if a plate or a film is dyed in the mass with a fluorescent dyestuff, which is excited by the radiation.

This process has the disadvantage that losses occur very easily on account of absorption caused by the dyestuff inside of the optical medium through which the fluorescent light is conducted, if the dyestuff, as it happens quite frequently, absorbs a spectral portion of the fluorescent light.

The main object of the present invention is therefore to provide an apparatus for the intensification of weak radiations not showing the above disadvantages.

Another object is to provide an apparatus using fluorescent light being excited by the weak radiation.

Still another object is to make use of the total reflection without loss of light on account of absorption in the fluorescent dyestuff.

Another object is to make one end-face of the apparatus, for instance of the glass rod, strongly reflecting.

Still further objects will become apparent from the detailed specification following hereinafter.

Figure 1:
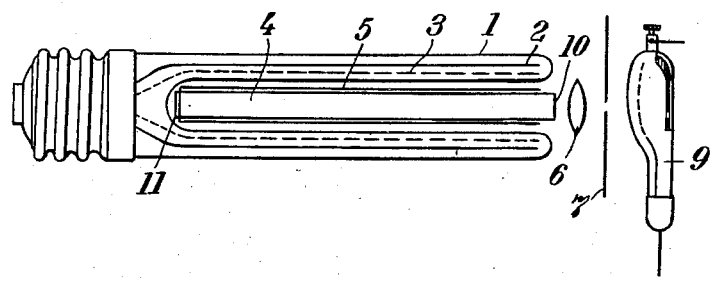

In the drawing, which forms a part of this specification, Figure 1 shows a circular rod according to the invention, as used in connection with a glow lamp and a photocell system.

Figure 2:
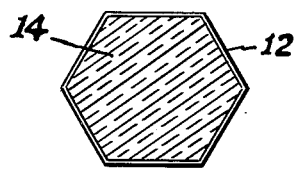

Figure 2 is a cross-sectional view of a rod formed as a polygon.

According to this invention therefore not the whole mass, but only the outside of the rod or polygon of any cross section (for example circular or angular cross section) is coated with the fluorescent material, except the end-face of the smaller sides. As fluorescent material the usual fluorescent dyestuffs, for instance rodanin, fluorescein, come into question. Furthermore the usual phosphors or their mixtures may be employed, which are excited also by X-ray emissions. One end of the rod is preferably covered with a strongly reflecting layer, for instance with a silver coating, or with a metal layer of good reflecting properties and the like, in order to concentrate the entire fluorescent light to a single end-face of the rod. The rod must practically in its entire length be in contact with the radiation, which is to be intensified. The rod may also be curved and possess for some purposes a very small diameter of few millimeters only. It is useful to employ rods consisting of masses with high optical refractive power. Needless to say, that the mass the rod consists of must as much as possible be optically homogeneous. Glasses with a high refractive index come especially into question. Also other materials may be used.

The application of the invention is manyfold. It may be used when weak radiations are to be intensified for visual observation in a simple manner, for instance for the detection of ultraviolet rays or X-ray emissions. Furthermore in photometry, when gauging feebly luminous, possibly colored areas. A special application of this invention may be found in the intensification of the light-effect of glow lamps as they serve for instance in sound film technique for the taking of the sound. Such a form of application will be described in the following:

In a glass tube 1 (see Figure 1) are the electrodes 2 and 3 of the usual glow lamps the form of which, however, must be especially chosen for the intended use. The cylinder-shaped electrode 2 is during operation on the inside covered with the glow light. Since the electrode 3 also cylinder-shaped is manufactured as net with wide meshes, the glow light formed on the inside of the electrode 2 falls first through electrode 3, then through the glass wall of the glow tube onto the surface 5 of the glass rod 4. The surface 5 consists of a fluorescent material which transforms the light coming from glow electrode 2 into light of different color, for instance into red light. By total reflection in the interior of rod 4 the secondary light is conducted for the most part to the end-faces 10 and 11 of the rod. In the example described here, the end-face 11 may be coated by a silver mirror, whereas opposite the end-face 10 a conversion lens 6 is arranged. By the silver mirror of end-face 11 the secondary light arriving there is reflected and partly also conducted towards the end-face 10. The conversion lens 6 illuminates a slit behind which is arranged a photocell 9. Figure 2 shows in cross-section a polygonal rod 14 provided with a similar surface coating 12.

By this arrangement the relatively low light-density of the glow lamp is changed by transformation and accumulation within the rod into a relatively high light-density and this is conducted to a photocell over an optical slit system.

What we claim is:

1. An apparatus for the intensification of weak radiations, especially light- and ultraviolet emissions, comprising a rod, consisting of an optically homogeneous uncolored mass having on its surface with the exception of the end-faces a fluorescent coating excited by said radiation.

2. An apparatus for the intensification of weak radiations, especially light- and ultraviolet emissions, comprising a polygon of an optically homogeneous uncolored mass having on its surface with the exception of the end-faces a fluorescent coating excited by said radiation.

3. An apparatus according to claim 1 comprising a highly reflecting metal layer on one end-face of the rod.

4. An apparatus according to claim 1 in which the mass of the rod has a high refractive index.

5. An apparatus according to claim 1, comprising a highly reflecting metallic silver layer on one end face of the rod.

HANS ARENS.
KARL van BRIESSEN.